(12) United States Patent
Zhao et al.

(10) Patent No.: US 11,792,167 B2
(45) Date of Patent: Oct. 17, 2023

(54) FLEXIBLE DATA SECURITY AND MACHINE LEARNING SYSTEM FOR MERGING THIRD-PARTY DATA

(71) Applicant: Microsoft Technology Licensing, LLC, Redmond, WA (US)

(72) Inventors: Haifeng Zhao, San Jose, CA (US); Yang Chen, Sunnyvale, CA (US); Jiashuo Wang, Mountain View, CA (US); Xiaojing Chen, Santa Clara, CA (US); Chencheng Wu, Los Altos, CA (US); Souvik Ghosh, Saratoga, CA (US); Ankit Gupta, Fremont, CA (US); Jing Wang, Los Altos, CA (US); John Patrick Moore, San Francisco, CA (US); Henry Heyburn Pistell, Ridgewood, NJ (US); Mira Thambireddy, San Mateo, CA (US); Haowen Cao, Sunnyvale, CA (US); Keyi Yu, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 17/219,482

(22) Filed: Mar. 31, 2021

(65) Prior Publication Data

US 2022/0321541 A1 Oct. 6, 2022

(51) Int. Cl.
*H04L 9/40* (2022.01)
*G06N 20/00* (2019.01)

(52) U.S. Cl.
CPC ......... *H04L 63/0428* (2013.01); *G06N 20/00* (2019.01)

(58) Field of Classification Search
CPC ... H04L 63/0428; H04L 63/20; H04L 63/105; G06N 20/00
See application file for complete search history.

(56) References Cited

U.S. PATENT DOCUMENTS 10,692,127 B1 * 6/2020 Kumar ............... G06N 7/01
2015/0379072 A1 12/2015 Dirac et al.
(Continued)

OTHER PUBLICATIONS

S. D. C. d. Vimercati, S. Foresti, S. Jajodia, S. Paraboschi, G. Pelosi and P. Samarati, "Encryption-Based Policy Enforcement for Cloud Storage," 2010 IEEE 30th International Conference on Distributed Computing Systems Workshops, Genoa, Italy, 2010, pp. 42-51, doi: 10.1109/ICDCSW.2010.35. (Year: 2010).*
(Continued)

*Primary Examiner* — Robert B Leung
(74) *Attorney, Agent, or Firm* — NICHOLSON DE VOS WEBSTER & ELLIOTT LLP

(57) ABSTRACT

Techniques for a flexible data security and machine learning system for merging third-party data are provided. In one technique, the system receives a data set from a third-party entity and receives selection data that indicates that the third-party entity selected a set of data security policies that includes an encryption option and a data mixing option from among multiple data mixing options. In response to receiving the selection data, the system stores data that associates the set of data security policies with the data set, encrypts the data set according to the encryption option, and persistently stores the encrypted data set. Later, the system decrypts the encrypted data set in volatile memory, generates, based on the data mixing option, training data based on the decrypted version of the data set, trains a machine-learned model based on the training data, and stores the machine-learned model in association with the data set.

20 Claims, 5 Drawing Sheets

(56) References Cited

U.S. PATENT DOCUMENTS

| | | |
|---|---|---|
| 2019/0012609 A1 | 1/2019 | Fishler et al. |
| 2019/0102675 A1* | 4/2019 | Biswas .................. G06N 3/045 |
| 2020/0042828 A1* | 2/2020 | Silberman .............. G06N 20/00 |
| 2020/0402625 A1 | 12/2020 | Aravamudan et al. |
| 2021/0397726 A1* | 12/2021 | Kulaga ................. G06F 16/285 |
| 2022/0253540 A1 | 8/2022 | Xu et al. |

OTHER PUBLICATIONS

D. Thilakanathan, S. Chen, S. Nepal and R. Calvo, "SafeProtect: Controlled Data Sharing With User-Defined Policies in Cloud-Based Collaborative Environment," in IEEE Transactions on Emerging Topics in Computing, vol. 4, No. 2, pp. 301-315, Apr.-Jun. 2016, doi: 10.1109/TETC.2015.2502429. (Year: 2016).*

"International Search Report and Written Opinion Issued in PCT Application No. PCT/US22/012695", dated Mar. 31, 2022, 10 Pages.

* cited by examiner

FLEXIBLE DATA SECURITY AND MACHINE LEARNING SYSTEM FOR MERGING THIRD-PARTY DATA

TECHNICAL FIELD

The present disclosure relates to data security and machine learning and, more particularly to, a flexible data security and machine learning system that ingests and processes different third-party data depending on entity-selected options.

BACKGROUND

Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with a certain number of entities. The statistical model is trained based on multiple attributes (or factors). In machine learning parlance, such attributes are referred to as "features." To generate and train a statistical model, a set of features is specified and a set of training data is identified.

Generally, the more training data that is used to train a model, the more useful the model is along one or more dimensions of utility, such as precision, recall, and accuracy. However, many entities that are potential sources of training data may not wish to share their respective data sets for training purposes due to data security concerns. For example, some data sets may contain highly sensitive data, such as data that uniquely identifies individuals or data that indicates associations between individuals. Unauthorized access to such data sets might result in many negative consequences. Therefore, such entities elect to not share access to their respective data sets out of concern over how the data sets are stored and processed. This lack of sharing not only prevents those entities from leveraging their own data sets and any machine-learned models trained therefrom, it also limits the utility of existing machine-learned models for sharing entities due to the scarcity of the training data upon which the machine-learned models are generated or trained.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
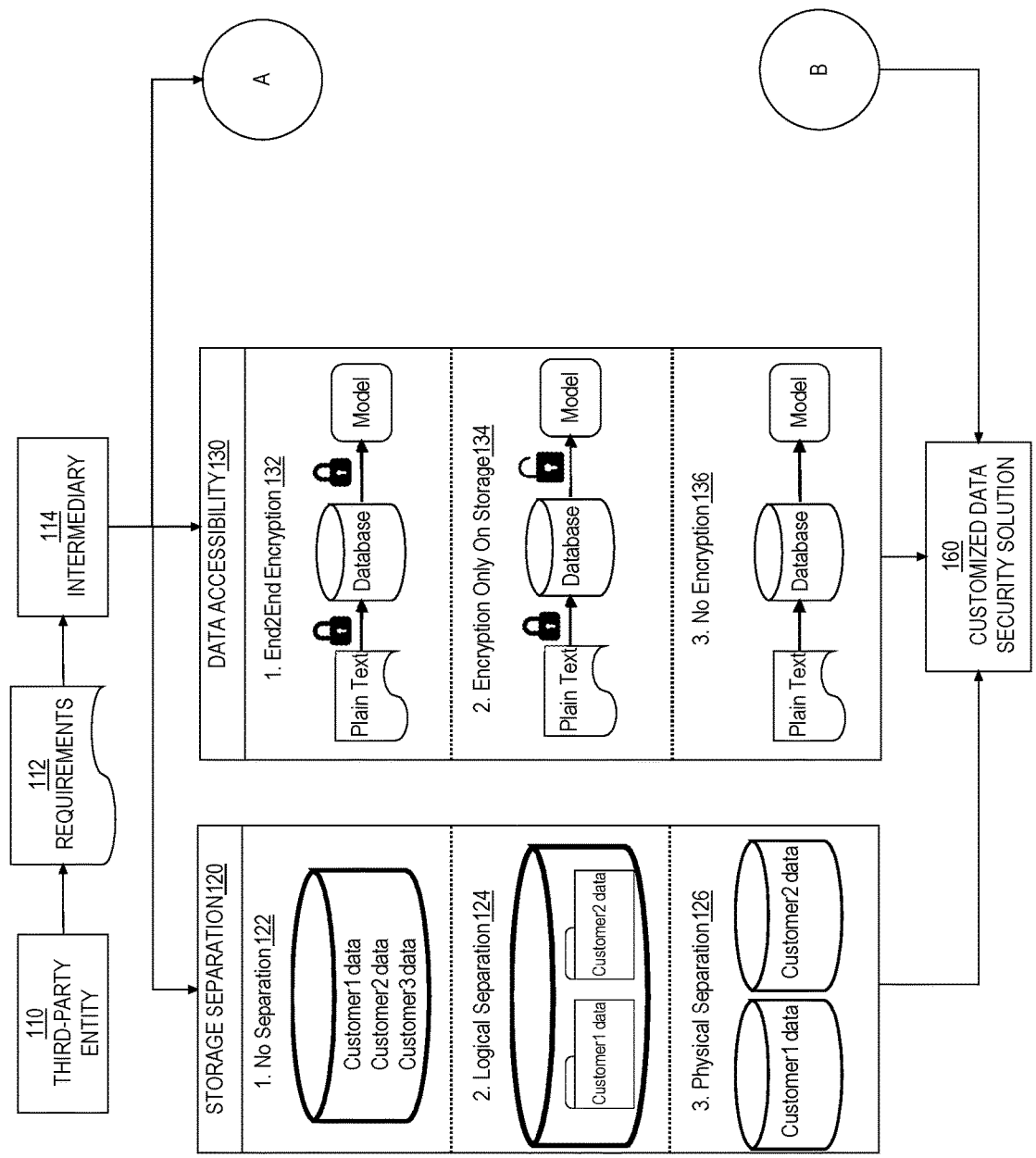
FIG. 1 (consisting of FIGS. 1A and 1B) is a block diagram that depicts various selectable options for different dimensions of data security, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A flexible data security and machine learning system allows third-party entities to share their respective data sets with the flexible data security system, which stores and processes the data sets at varying selectable levels of data security. One aspect or feature of the flexible data security and machine learning system allows third-party entities to select a data mixing option from among multiple data mixing options. Other aspects of the flexible data security and machine learning system allow third-party entities to select (a) a data separation option from among multiple data separation options (related to how their respective data sets are stored) and/or (b) a data accessibility option from among multiple data accessibility options (related to data encryption).

Thus, embodiments offer flexible data storage and processing options to third-party entities. Some third-party entities with less stringent data security requirements will benefit from more accurate machine-learned models while other third-party entities with more stringent data security requirements will benefit from more data security. For example, in one data accessibility option, a third-party data set is decrypted in memory and training data is generated therefrom, where the training data does not include any confidential or user identifying information. Thus, while unauthorized access to training data might not be preventable, such access will not reveal any decrypted data about the corresponding entities, whether individuals or organizations. In this way, third-party entities can trust that a decrypted version of their data will not be exposed to unauthorized users. Additionally, the machine learning system has access to more data than was previously available. The machine learning system processes that data in a secure manner to generate training data, which is then used to train one or more machine-learned models. Due to the amount of additional training data and the nature of the training data, the accuracy of machine-learned models is greatly improved.

Data Set

A data set (from a third-party entity) may be organized in one of multiple ways, such as relationally in one or more tables (rows and columns or records and fields) or in key-value mappings. A data set may comprise hundreds, thousands, or tens of thousands of records. Each record may correspond to a different entity, such as a user or an organization. Example organizations include groups of people, companies, charitable organizations, government organizations, academic institutions, non-profit institutions, and trade associations.

An example of the type of data in a data set is customer relationship management (CRM) data. Thus, examples of fields in a CRM record corresponding to a person include first name, last name, job title, job function, industry name, employer name, geographic location, phone number, email address, mailing address, date of first contact, date of most recent contact, number of messages sent to the person, number of messages received from the person, deal status, past deals made, etc.

Data sets from different third-party entities may have the same data schema, which refers to the organization of data as a blueprint of how the data set is constructed, for example, divided into tables in the case of a relational database. In this way, the two data sets may be combined or merged to create a single data set, or the same operations to generate training data based on one data set may be used to generate training data based on the other data set.

Additionally or alternatively, data sets from different third-party entities may have different data schemas. In this scenario, one or both of the data sets may be transformed so that both are organized according to the same data schema. Example transformations include dropping fields or columns from one data set, renaming one or more fields or columns, and converting data values in a data set from one format to another (e.g., integer to float or string to characters).

Where a data set is hosted may dictate the data schema to which the data set conforms. Examples of CRM hosting services include Microsoft Dynamics 365, Salesforce, Oracle CX Sales, and SAP Sales Cloud. Each CRM hosting service may have a data different schema. Thus, data sets from different CRM hosting services may be subject to different data transformations before being processed for one or more downstream purposes, such as machine learning.

Use Cases

Embodiments may be implemented in one or more scenarios. An example use case is a third-party entity sharing its CRM data with a content sharing platform that stores entity profiles on behalf of those entities, where the profiles contain information that the entities provided to the content sharing platform, an example of which is an online connection network, such as LinkedIn. In doing so, the content sharing platform supplements at least some CRM records with profile data from profiles that matching entities indicated in the CRM data. For example, given a first name, last name, and employer name in a CRM record, the content sharing platform searches a profile database for a profile that matches those three data items. The profile that matches contains other information about the individual indicated in the CRM record, such as skills that the individual has, connections of the individual in an online network, previous employers, and academic institutions attended. That other information is made available to the third-party entity to allow the third-party entity to make targeted actions with respect to the individual. Examples of targeted actions include creating a content delivery campaign that targets the individual and users similar to the individual and sending notifications or other messages that are tailored, or customized, to the individual.

Additionally or alternatively, after matching CRM records to profiles to create a set of combined data, content sharing platform may generate training data based on the combined data, train one or more machine-learned models based on the training data, invoke or leverage the model(s) to generate model output, generate recommendations based on the model output, and provide the recommendations to the third-party entity. Examples of recommendations include identifying individuals or other entities on which the third-party entity should focus its resources.

Flexible Data Security Policy

Figure 1B:
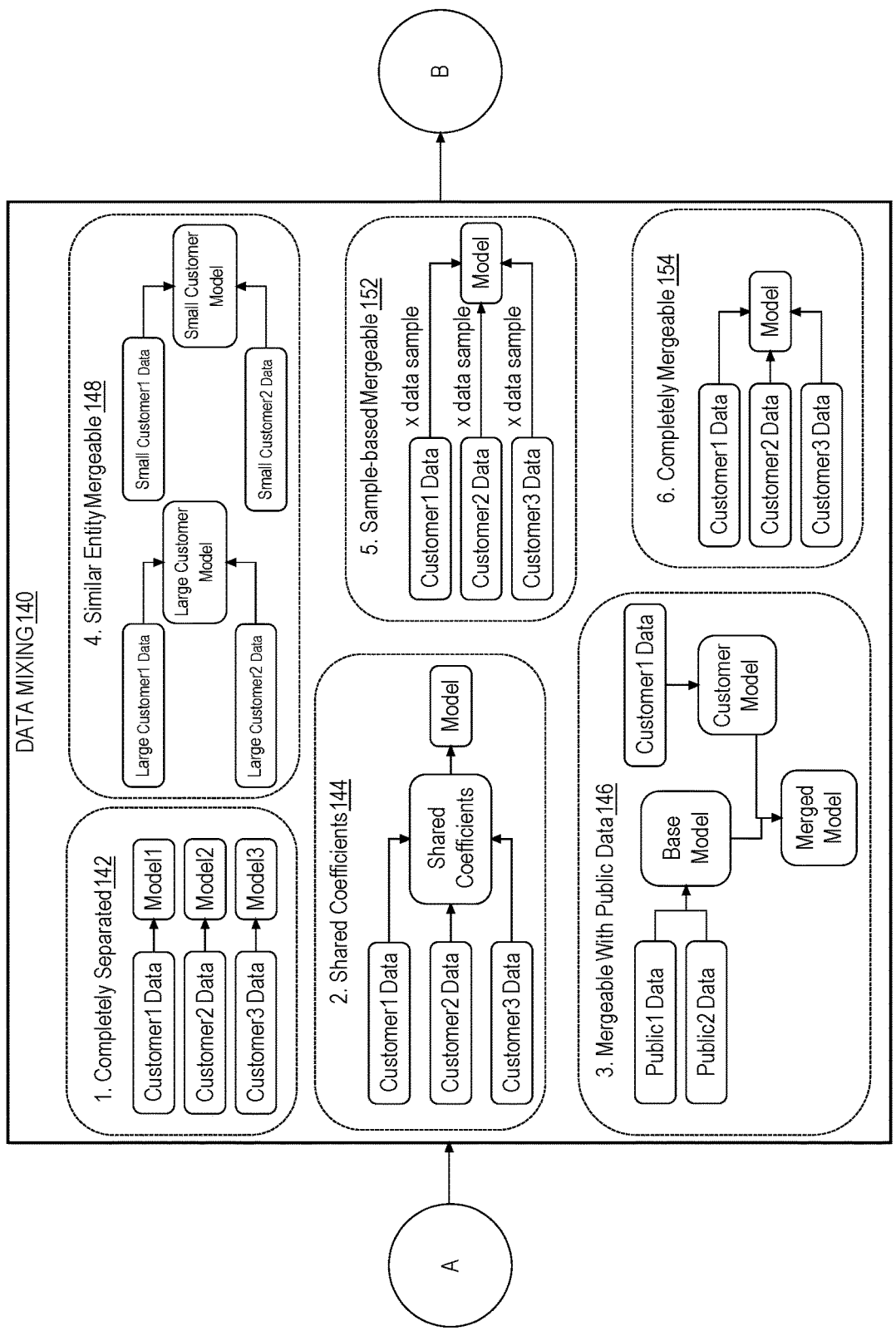

FIG. 1 is a block diagram that depicts various selectable options for different dimensions (or policy domains) of data security, in an embodiment. A third-party entity selects through an intermediary 112, such as a user interface that is presented on a computing device of the third-party entity, an option from each dimension of one or more dimensions. Once the third-party entity selects a set of data security options, a data set owned or managed by the third-party entity is transmitted to a machine learning system for storage and processing according to the set of data security options. The machine-learning system, as described in more detail herein, includes components and functionality that adhere to the selected data security options and may be part of the content sharing platform described herein.

As FIG. 1 depicts, a third-party entity 110 has a set of one or more requirements 112, examples of which include a confidentiality requirement, a competitor exclusion requirement, and a fairness requirement. Based on the one or more requirements, third-party entity 110 selects a data security option associated with each data security aspect or policy domain. Alternatively, selection of a requirement maps directly to one or more data security options. For example, the competitor exclusion requirement may map directly to the completely separated data mixing option 142 (described in more detail herein). Thus, third-party entity selection of that requirement automatically associates a data set from the third party entity with the completely separated data mixing option 142. Example data security aspects or policy domains include storage separation 120, data accessibility 130, and data mixing 140. An output of third-party entity selection is a customized data security policy 160 that comprises multiple data security options (that the third-party entity selected) that pertain to different policy domains related to data security.

Storage Separation Options

Examples of options of storage separation 120 include no separation option 122, logical separation option 124, and physical separation option 126. If a third-party entity selects the no separation option 122 for a data set, then the machine learning system stores that data set in the same storage device as the data sets of other third-party entities that selected the same option. Also, that data set is not logically separated from those other data sets. Instead, that data set may be in the same logical location (e.g., folder) as one or more other data sets, or interleaved with other data sets. Additionally, that data set might not be stored with an entity or source identifier that uniquely identifies the source or third-party entity from which that data set originated.

If a third-party entity selects the logical separation option 124 for a data set, then the machine learning system may store that data set on the same storage device as data sets from other third-party entities, but those other data sets are not stored in the same logical storage location, such as the same folder. Instead, the data set is stored logically separate from any other data set. For example, the data set may be stored in one or more tables and those tables are prohibited from storing data from any other data set. Thus, logically separately data sets may include separate folders, tables, containers, and databases.

If a third-party entity selects the physical separation option 126 for a data set, then the machine learning system stores the data set persistently on a storage device that does not store a data set from another third-party entity. While this option provides the highest level of privacy, it has low scalability.

In one embodiment, storage separation options dictate data mixing options, whereas, in another embodiment, storage separation options are independent of data mixing options. Thus, in the one embodiment, a third-party entity may select the physical separation option 126 for a data set, meaning that the data mixing options pertaining to combining or merging the data set with other data sets are unavailable. However, in the other embodiment, a third-party entity may select the physical separation option 126 for a data set but also select a data mixing option for the data set, where the data mixing option allows for merging other data sets with the data set, meaning that the data set may be combined or merged with one or more other data sets when generating training data for a single model.

Data Accessibility Options

Examples of options of data accessibility 130 include end-to-end encryption option 132, encryption on storage option 134, and no encryption option 136. If a third-party entity selects the end-to-end encryption option 132 for a data set, then the machine learning system ensures that the data set is encrypted prior to persistent storage in non-volatile storage and remains encrypted, even in non-persistent storage (or volatile storage) while processing the data set to generate a machine-learned model. However, the number and/or types of machine-learned models that can be trained using the encrypted data set may be limited. For example, some machine-learned models may include features that require identifying one or more similarities between two text items; however, since each item in the data set is encrypted, no such text similarity comparisons can be made. Therefore, the utility of a fully encrypted data set may be greatly diminished, depending on the downstream machine-learned models.

If a third-party entity selects the encryption on storage option 134 for a data set, then the machine learning system encrypts the data set and persistently stores (i.e., in non-volatile storage) the encrypted data set. However, the machine learning system may decrypt and process the data set (e.g., generate training data therefrom) in volatile memory. Nevertheless, none of the decrypted version of the data set is stored persistently in non-volatile storage. In this way, any unauthorized access to the encrypted data set does not reveal any personal (or otherwise private or confidential) information and, yet, the data set may be used to generate a machine-learned model, as described in more detail herein.

If a third-party entity selects the no encryption option 136 for a data set, then the machine learning system persistently stores the data set in plain text (i.e., does not encrypt the data set). Therefore, the machine learning system is not required to decrypt the data set and may use the entirety of the data set to generate training data for training one or more machine-learned models.

As a hybrid approach to options 132, 134, and 136, the machine learning system may encrypt only a portion of a data set from a third-party entity. For example, a data set may include a name, a phone number, a job title, a set of skills, and an industry of multiple users. A third-party entity may elect to have only the name and phone number data encrypted from end-to-end while the other attributes are encrypted only on storage. Therefore, the other attributes may be decrypted and used to generate training data for one or more machine-learned models.

Data Mixing Options

Examples of options for data mixing 140 include a completely separated option 142, a coefficient sharing option 144, a mergeable with public data option 146, a similar entity mergeable option 148, a sample-based mergeable option 152, and a completely mergeable option 154.

If a third-party entity selects the completely separated option 142 for a data set, then the machine learning system ensures that the data set is not combined with a data set from any other third-party entity. Instead, the machine learning system generates training data from the data set and trains an entity-specific model based on that training data. That entity-specific model is used to generate output (e.g., a prediction) based on input from the third-party entity. Thus, the data set of the third-party entity is not used to benefit any other third-party entity. However, a disadvantage of option 142 to third-party entities is that the quality of their respective machine-learned models (e.g., in terms of accuracy, precision, and recall) is less than it would be with other options described herein. A disadvantage of option 142 to the machine learning system is that building and maintain entity-specific models is hard to scale and requires significant computing resources relative to approaches/options where relatively few machine-learned models are built and maintained.

If a third-party entity selects the coefficient sharing option 144 for a data set, then the machine learning system generates training data based on the data set (and no data set from any other third-party entity) and trains an entity-specific model based on the training data. The machine learning system then combines the coefficients that were learned for the model with coefficients that were learned for one or more other models that were trained based on one or more data sets from one or more other third-party entities. In this way, the one or more other data sets benefit (at least indirectly) the third-party entity. An advantage of option 144 to the machine learning system is that only a single machine-learned model may be sufficient to serve all third-party entities. An advantage of option 144 to third-party entities is that there is a low indirect benefit (compared to other options described herein) to their respective competitors that select this option. In other words, competitors of a third-party entity that also choose option 144 benefit from the data set of that third-party entity because the machine-learned model is trained based the third-party entity's data set. (Data mixing options with higher benefit to competitors include options 148, 152, and 154.) Nevertheless, there is a sharing of indirect information across third-party entities, some of which may be competitors of each other.

If a third-party entity selects the mergeable with public data option 146 for a data set, then the machine learning system generates training data based on the data set and trains an entity-specific model based on the training data. The machine learning system also trains a base model based on another set of training data that is based on a publicly available data set, or a data set that is available to the entity that hosts or owns the machine learning system. The base model and the entity-specific model are combined to create a merged model, such as a GLMix (Generalized Linear Mixed) model. Therefore, the merged model may be used to make predictions based on input data from the third-party entity. In this way, the third-party entity may benefit from a larger data set, especially if the data set from the third-party entity is relatively small.

An advantage to a third-party entity that selects option 146 is that no competitor benefits from the data set from that third-party entity. However, a disadvantage to such a third-party entity is that the mixed or merged model may be heavily biased on the public data. A disadvantage of option 146 to the machine learning system is that building and maintaining mixed entity-specific models is hard to scale and requires significant computing resources relative to approaches where relatively few machine-learned models are built and maintained.

If a third-party entity selects the similar entity mergeable option 148 for a data set, then the machine learning system generates training data based on the data set and one or more data sets of one or more other third-party entities that are similar to the third-party entity along one or more dimensions, such as size of the data sets, size of the respective entities in terms of number of employees or revenue. If similarity is based on size of a data set, then server system 130 determines the size of the data set and identifies other data sets that are of similar size, such as within 10% of each other. Alternatively, server system 130 stores a pre-defined size ranges and the third-party entities that have data sets that fall within a particular size range are considered similar entities. If similarity is based on another dimension or attribute, such as number of employees or revenue, then server system 130 again may store pre-defined ranges for each dimension and determine the dimension values of third-party entities based on publicly-available data, such as a company profile that indicates the number of employees. The machine learning system then trains a model based on the combined training data. For example, the machine learning system may train: (1) a first model based on data sets from relatively large entities; (2) a second model based on data sets from relatively small entities; and (3) a third model based on data sets from medium-sized entities.

In this way, the third-party entity may benefit from a model that is trained based on a larger combined data set, parts of which come from similar entities. Also, similar sized third-party entities (in terms of sizes of their respective data sets) benefit equally while the overall number of machine-learned models are limited. For example, if there are three classes of third-party entities (e.g., based on size of the respective data sets or based on size of the third-party entities in terms of number of employees), then there might be only three or six machine-learned models, depending on the number of different models (having different features) that may be trained based on the same data set.

A disadvantage of option 148 is that the different classes of third-party entities must be built and maintained and that assignment from each third-party entity to a class should be monitored as the size of a data set from a third-party entity may change over time, sometimes quickly. Also, since the number of third-party entities in each class may change over time, the class sizes (in terms of number of third-party entities and size of the respective data sets) may change greatly leading to an unbalanced situation where only a few or one third-party entity may be assigned to a class and where the amount of data in the combined data sets of a class may be relatively small, limiting the benefit to the third-party entities that are assigned to that class.

If a third-party entity selects the sample-based mergeable option 152 for a data set, then the machine learning system first samples an amount of data from the data set along with sampling an amount of data from other data sets (provided by other third-party entities who selected the same option) and adds the samples together to generate a combined data set. The amount of data sampled from each data set may roughly equal, such as five hundred records or rows. The machine learning system then generates training data based on the combined data set and trains a model based on that training data. An advantage of option 152 is that all third-party entities benefit equally from the single machine-learned model. However, the model quality might not sufficiently benefit large third-party entities (in terms of sizes of their respective data sets).

If a third-party entity selects the completely mergeable option 154 for a data set, then the machine learning system combines the data set with data sets provided by other third-party entities who selected the same option to generate a combined data set. The size of the various data sets from the different third-party entities may vary greatly. The machine learning system then generates training data based on the combined data set and trains a model based on that training data. In this way, the machine-learned model performs best (e.g., in terms of precision, recall, or accuracy) relative to other models that are generated using the other techniques associated with the other options, assuming that the amount of training data with this option is greater than the amount of training data used in the other options. A possible disadvantage of option 154 is that third-party entities that share relatively larger data sets do not benefit as much as third-party entities that share relatively smaller data sets.

Different Data Sets and Policy Updates

In an embodiment, a third-party entity establishes a different data security policy for different data sets from the third-party entity. For example, a third-party entity selects a first set of data security options for a first data set and a second set of data security options for a second data set. As a specific example, the first set of data security options include the logical separation option 124, the encryption on storage option 134, and the similar entity mergeable option 148, while the second set of data security options include the no separation option 122, the no encryption option 136, and the sample-based mergeable option 152.

In an embodiment, a third-party entity updates a data security policy for a single data set. For example, the third-party entity selects the following data security options for a data set: the no separation option 122, the encryption on storage option 134, and the sample-based mergeable option 152. The machine learning system stores and processes the data set according to this flexible data security policy. Later, the third-party entity updates this flexible data security policy to replace the sample-based mergeable option 152 with the mergeable with public data option 146. Accordingly, the machine learning system will no longer sample the data set from the third-party entity along with sampling from other data sets to generate training data for a model. Instead, the machine learning system will generate a merged model based on the data set from the third-party entity. Also, the machine-learned model that was generated based on the third-party entity's data set may be discarded and retrained based on data sets that are currently associated with option 152.

System Overview

Figure 2:
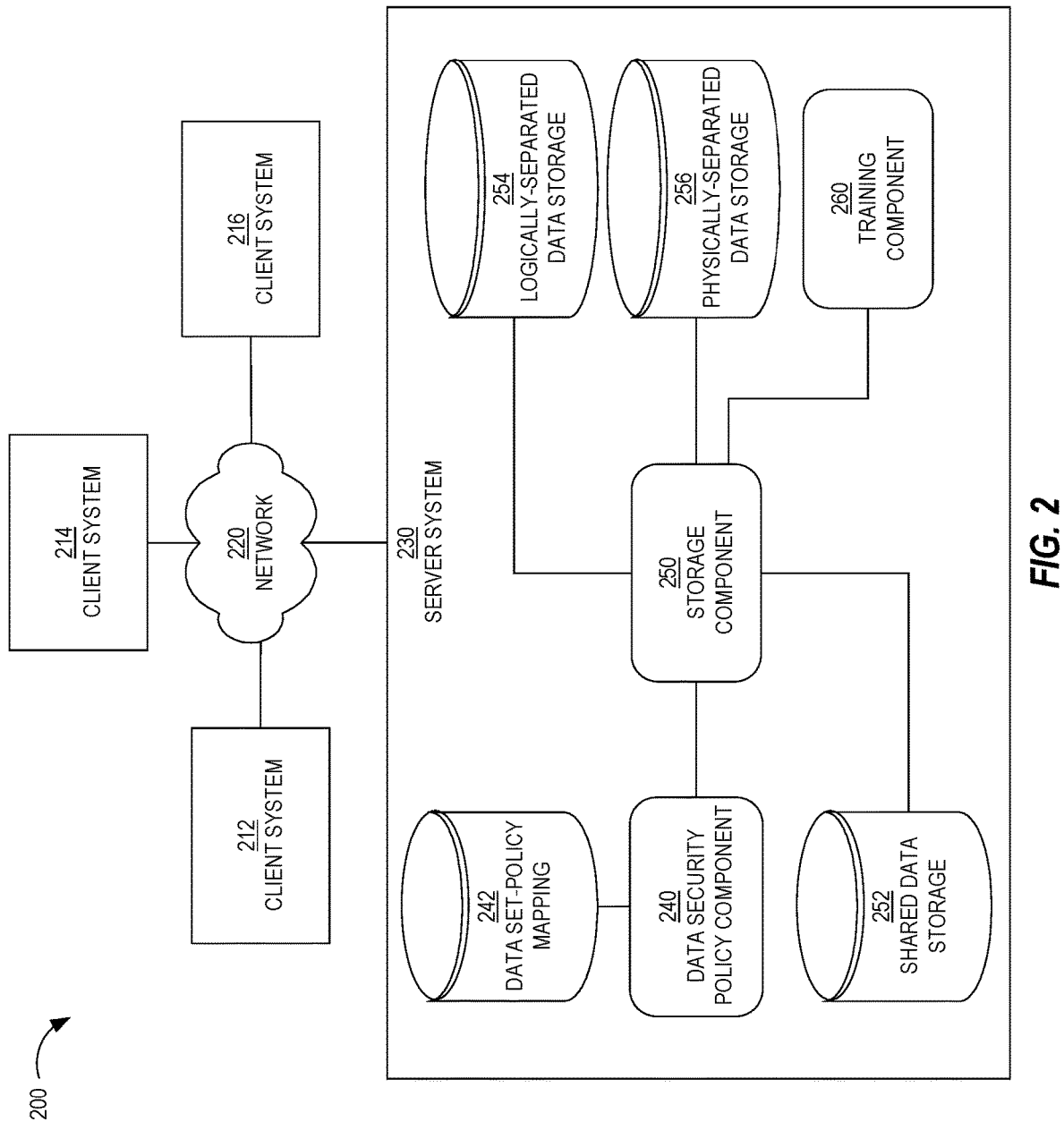
FIG. 2 is a block diagram that depicts an example system for storing and processing third-party data sets in a secure manner, in an embodiment.

FIG. 2 is a block diagram that depicts an example system 200 for storing and processing third-party data sets in a secure manner, in an embodiment. System 200 includes client systems 212-216, a network 220, and a server system 230. Server system 230 comprises a data security policy component 240, a data set-policy mapping 242, a storage component 250, a shared data storage 252, a logically-separated data storage 254, a physically-separated data storage 256, and training component 260. Each of components 240-260 is implemented in software, hardware, or a combination of software and hardware. The functionality of components 240-260 may be implemented in a single program or in across multiple programs in order to adhere to component-based software engineering.

Components 240-260 may be implemented on the same computing device or on multiple computing devices. For example, each of components 240-260 may be implemented on different computing devices that are communicatively coupled to each other over a computer network, such as a local area network (LAN), wide area network (WAN), or the Internet. Similarly, client systems 212-216 are communicatively coupled to server system 230 over network 220. Although only three client systems 212-216 are depicted, system 200 may include many client systems that are communicatively coupled to server system 230 over network 220.

Each of client systems 212-216 is remote relative to server system 230. Each of client systems 212-216 corresponds to a different third-party entity that owns or maintains the client system. Each of client systems 212-216 stores one or more data sets that are owned by the corresponding third-party entity. A data set may be stored in a data storage that is local to the corresponding client system.

Alternatively, a data set may be stored in a cloud service that is remote relative to both the corresponding client system and server system 230. In this case, a user or representative of a third-party entity may operate a computing device that provides, to server system 230, instructions on how to retrieve one or more data sets over computer network 220 from the cloud service. The instructions may include credentials (e.g., username and password) of the third-party entity to allow server system 230 access the data set(s) from the cloud service.

Instead of server system 230 retrieving a data set from the corresponding client system (or cloud service), the data set may be "pushed" or transmitted from the client system (or cloud service) to a certain (e.g., HTTP) endpoint of server system 230.

Data Security Policy Component

Data security policy component 240 stores, updates, and maintains data set-policy mapping 242. Data security policy component 240 receives data security options that a third-party entity selected and associates the selected data security options with a data set that is transmitted from a client system, such as client system 212.

Data security options may be selected by a third-party entity in a number of ways. One example way is through a user interface, provided by server system 230, that is presented in a web browser executing on a computing device of the third-party entity. Examples of such a computing device include a desktop computer, a laptop computer, and a smartphone. Another example way is through a computing device operated by a user, representative, or administrator (of server system 230) who inputs the selected data security options into a user interface presented on a screen of computing device after receiving oral instructions from the third-party entity.

Given a data security policy selected by a third-party entity, data security policy component 240 creates a record that associates the data security policy with the third-party entity and/or a data set from the third-party entity. Data security policy component 240 stores the record in data set-policy mapping 242. At the time the record is created, server system 230 might not yet have received the data set from a client system of the third-party entity. However, data security policy component 240 may still create a data set identifier that uniquely identifies the data set from other data sets stored in data storages 252-256. If server system 230 grants permission to third-party entities to store only a single data set, then a data set identifier may be a third-party entity identifier of the third-party entity that provided the data set.

If a third-party entity has multiple data sets and server system 230 grants permission for a single data security policy to be associated with the multiple data sets, then the record may include multiple data set identifiers, which may or may not be based on a third-party entity identifier of the third-party entity. For example, a first data set identifier may be the third-party entity identifier for the third-party entity plus an additional identifier (e.g., TPE_ID_304_1) and a second data set identifier may be the third-party entity identifier for the third-party entity plus another additional identifier (e.g., TPE_ID_304_2). In this way, each data set identifier is unique relative to all other data set identifiers in the data set-policy mapping 242.

If a third-party entity has multiple data sets and server system 230 grants permission to the third-party entity to establish different data security policies for the multiple data sets, then a separate record may be created for each data set. Again, the data set identifier of each data set may be based on the third-party entity identifier plus an additional identifier so that each data set identifier is unique relative to all other data set identifiers in data set-policy mapping 242.

Conflict Check

In an embodiment, data security policy component 240 determines whether two or more selected data security options for a data set conflict. For example, if a third-party entity selects the end-to-end encryption option 132 for a data set, then the data set is not mergeable with other data sets. Therefore, options 148-154 conflict with option 132 and are, thus, unavailable when option 132 is selected. Therefore, if two selected data security options conflict, then data security policy component 240 generates a notification that indicates that a conflict exists. The notification may identify the two or more options that conflict. The notification may prompt a user to make a different option selection. Data security policy component 240 causes the notification to be presented on a screen of a computing device of a user or representative of the third-party entity of a user or representative of server system 230. The notification may be transmitted using one or more communication channels, such as an email or a push notification to the computing device.

In a related embodiment where a user interface with the data security options pertaining to the different policy domains is presented, the user interface is dynamically updated when a user or representative of a third-party entity selects an option in one policy domain that conflicts with one or more other options in one or more other policy domains. The update may involve preventing the one or more other options from being selectable. For example, the one or more options may be visibly grayed out, indicating that those options are unavailable.

Storage Component

Storage component 250 stores a data set in one of data storages 252-256 according to the data security policy for the data set. Storage component 250 may use a data set identifier of the data set to look up the corresponding record in the data set-policy mapping 242 to determine the storage policy for the data set and/or the data accessibility/encryption policy for the data set.

When storage component 250 receives the data set (e.g., from client system 212), storage component 250 stores the data set in one of data storages 252-256, according to the storage policy. For example, if the storage policy for a data set is the no separation option 122, then storage component 250 causes the data set to be stored in shared data storage 252 along with data sets from other third-party entities. The data set may or may not be associated with the corresponding third-party entity using an identifier. Encryption may be unavailable for data sets that are stored in shared data storage 252. Shared data storage 252 may comprise a single storage device or multiple storage devices.

If the storage policy for a data set is the logical separation option 124, then storage component 250 causes the data set to be stored in logically-separated data storage 254 along with any data sets from other third-party entities that selected the same option for their respective data sets. For example, each data set may be stored in a different folder in logically-separated data storage 254. Like shared data storage 252, logically-separated data storage 254 may comprise a single storage device or multiple storage devices.

If the storage policy for a data set is the physical separation option 126, then storage component 250 causes the data set to be stored in physically-separated data storage 256, which may comprise multiple storage devices, each dedicated to storing no more than a single data set.

After storage component 250 determines a data storage in which to store a data set, storage component 250 may update data set-policy mapping 242 (or another mapping that associates data sets with their respective data storage locations) to indicate a storage location of the data set. Thereafter, one or more components of server system 230 (e.g., component 260) use the data set-policy mapping 242 (or other mapping) to identify, given a data set identifier, a storage location of the corresponding data set.

Data Set Refresh

In an embodiment, server system 230 automatically "refreshes" a data set. A "refresh" of a data set is receiving a second version of a data set from a client system (or cloud service) (e.g., client system 212) after receiving a first version of the data set at a previous time. Between the two retrievals, the data set may have been updated at the client system. Example updates to a data set include an addition of new rows to the data set, a deletion of existing rows from the data set, and a modification of values in one or more rows of the data set.

A refresh of a data set may be triggered automatically, such as on a daily or weekly basis. Additionally or alternatively, a refresh may be triggered based on the occurrence of an event. An example event includes input from a user, such as a user or representative of the third-party entity that is the source of the data set, or a user or administrator of server system 230. Another example event includes a negative evaluation of a machine-learned model that was trained based on the data set. A negative evaluation may be (a) the machine-learned model failing a validation test (i.e., before the machine-learned model was put into production, or leveraged by a third-party entity) or (b) reflected in results from using the machine-learned model in production, which results indicate that the machine-learned model makes poor predictions. For example, key metrics associated with the machine-learned, such as click-through rate or conversion rate, may be below certain thresholds, indicating that the machine-learned model is not performing according to standards.

A data set refresh may be performed by data security policy component 240, storage component 250, or another component of server system 230. For example, in response to a determination that a data set is to be refreshed, storage component 250 generates and sends a request to a client system that is associated with the data set. Parameters for the request may be stored in a mapping that associates the request parameters with the data set, such as in data set-policy mapping 242. Example request parameters include a network location of the client system (e.g., IP address), a data set identifier that identifies the data set to the client system, any credentials to grant access to the data set, and an approximate or expected size of the data set. To the extent that server system 230 initiates a refresh automatically, a refresh schedule may be stored in association with the data set, such as in data set-policy mapping 242.

Data Accessibility

Storage component 250 ensures that data sets are encrypted (or not encrypted) in data storage, according to their respective data security policies pertaining to data accessibility. Such policies are found in data set-policy mapping 242. Thus, to determine a data accessibility policy for a data set, storage component 250 uses the data set identifier of the data set to look up the appropriate entry in data set-policy mapping 242. If the data accessibility policy for a data set indicates encryption at least in persistent storage, then storage component 250 causes the data set to be encrypted using an encryption key and store the encrypted data set according to the storage separation policy associated with the data set. The encryption key may be unique for each data set or for each third-party entity. For example, if a third-party entity provides multiple data sets to server system 230, then storage component 250 may use a single encryption key to encrypt the data in those data sets or may use a different encryption key for each of those data sets.

In an embodiment, storage component 250 leverages a key management system (KSM) to store encryption keys and apply those encryption keys on corresponding data sets. A KSM is a physical computing device that safeguards and manages digital keys, performs encryption and decryption functions for digital signatures, strong authentication, and other cryptographic functions. To encrypt or decrypt a data set, storage component 250 sends the data set and a key identifier to a KSM that stores the key for encrypting/decrypting the data set. An example of a KSM is a hardware security module (HSM).

In one scenario, a data set is already encrypted when the data set is received from a client system (e.g., client system 212). If the data set is associated with an encryption-only-on-storage policy, then the client system may also transmit a key identifier, with (or following or separate to) the data set, to server system 230. Storage component 250 leverages the key identifier, using a KSM, when causing the encrypted data set to be loaded into volatile memory and decrypted. For example, storage component 250 sends the encrypted data set (along with a key identifier) to the KSM, which retrieves the appropriate key, decrypts the encrypted data set, and returns the decrypted data set to storage component 250. An alternative to this scenario is server system 230 encrypting each data set from a client system, where each client system or data set-client system pair has its own key identifier. Again, the keys may be stored and used by a cryptographic device, such as an KSM.

When retrieving a data set from persistent data storage to volatile data storage for subsequent processing of the data set, storage component 250 determines a data accessibility policy for the data set (e.g., using data set-policy mapping 242). If the data accessibility policy is end-to-end encryption, then storage component 250 does not decrypt the data set after retrieving the data set from data storage. Instead, storage component 250 passes the data set on to another component, such as training component 260.

If the data accessibility policy is encryption-only-on-storage, then storage component 250 causes the data set to be decrypted in volatile memory after retrieving the encrypted data set from data storage. If the data accessibility policy is no encryption, then storage component 250 retrieves the data set from data storage and stores the data set in volatile memory.

Training Component and Data Mixing

Training component 260 generates training data based on a data set and trains a model based on the training data using one or more machine learning techniques. Embodiments are not limited to any particular machine learning technique for generating (or training) a model. Example machine learning techniques include linear regression, logistic regression, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, each training instance in training data comprises a label and multiple feature values, each corresponding to a different feature. Example features may be based on attributes found in entity profiles (e.g., profiles of users and/or profiles of organizations), online activity of users, online activity of connections (or "friends") of users in an online connection network, and similarities between two entities.

Initially, the number of features that are considered for training may be significant, such as in the hundreds. After training a machine-learned model and validating the model, it may be determined that a subset of the features have little correlation or impact on the final output. In other words, such features have low predictive power. Thus, machine-learned coefficients or weights for such features may be relatively small, such as 0.01 or −0.001. In contrast, weights of features that have significant predictive power may have an absolute value of 0.2 or higher. Training component 260 may identify and remove, from a set of training data, features with little predictive power. Removing such features can speed up the process of training future versions of a machine-learned model and computing output scores.

Training data comprises multiple training instances. Each training instance may be based on a different row or record in a data set. In order to generate a training instance, training component 260 identifies multiple attribute values from a record and generates a feature value for each feature of the to-be-trained model. A model has a model definition that defines each feature of the model and that indicates how a value for each feature is computed from one or more input data sources.

Thus, a feature value may be based on a single attribute value from the data set. For example, a feature may be whether the job industry attribute (or field) in a record indicates "Technology." Also, a feature value may be based on multiple attribute values. For example, a feature may be a number of messages that are sent to a principal (or someone with a certain job function) of a company within the last four weeks. One of the attributes indicated in a record of a data set may be a number of messages that were sent to a principal of a company within the last week and another one of the attributes may be a number of messages that were sent to a principal of a company between one week and four weeks from the present or current time. A feature value of this feature is computed by adding the two values for these two attributes. Examples of operations to compute a feature value based on multiple attribute values other than addition include subtraction, multiplication, division, percentile computation, and comparison (e.g., perfect match or partial match). A result of a comparison may be a 1 or 0 (indicating match or no match) or a value in between 1 and 0 (indicating a partial match).

In an embodiment, some attribute values found in a data set are mapped to an embedding, which is a vector of real numbers, each number corresponding to a latent dimension in a multi-dimensional space. One way to associate an attribute value with an embedding is with a value-embedding mapping, where the embeddings have already been learned by an embedding generator, such as word2vec or fastText. Another way to associate an attribute value with an embedding is to input the attribute value into an embedding generator that may have been trained based on "local" data, or data that is stored locally relative to server system 230. Whichever technique is used to determine an embedding for an attribute value in a data set, the embedding for one attribute value may be compared to an embedding of another attribute value, yielding a similarity measure, such as cosine similarity, Euclidean distance, and dot product.

After training a model based on a data set, training component 260 associates the model with the data set and/or the third-party entity that provided the data set. Such an association may involve storing a model identifier (that uniquely identifies the model) in a record or entry (of data set-policy mapping 242) for the data set. This association is used thereafter to identify the model to generate output based on input from the third-party entity or based on data within the data set.

In an embodiment, training component 260 (or one or more other components of server system 230 not depicted) implements any data mixing policy associated with data sets stored in data storages 252-256. Thus, training component 260 "mixes" (or merges or combines) two data sets prior to training a model. Two data sets may be mixed by creating a single data set from two data sets. For example, a first data set from a first third-party entity is appended to a second data set from a second third-party entity. As another example, the first data set is interleaved with the second data set. However, whether and how a data set is mixed (or combined) with other data sets depends on the data mixing policy associated with the data set. The data mixing policy of a data set may be indicated in data set-policy mapping 242 and determined by training component 260 (or another component of server system 230).

In an embodiment, training component 260 trains multiple models based on a single data set. The different models may be different types of models, such as a regression model and a deep and wide model (comprising one or more neural networks for the "deep" aspect of the model). The different models may have different features and, therefore, may rely on different portions of a data set. For example, one model may have features that rely on data fields A, B, F, and G from a data set, while another model may have features that rely on data fields, B, C, and E from the data set.

After training component 260 trains a model, a third-party entity that is associated with the model may leverage the model. "Leveraging" a model refers to providing data (input) to server system 230, which invokes the model by inputting that data into the model, which generates an output based on the input. (The time at which a model is invoked or leveraged is referred to as "inference time" with respect to the model.) Example actions that may be performed based on output from the model include classifying an entity (e.g., a user or company) that is associated with the input, generating and sending a notification (or other message) to the third-party entity, or ranking candidate content items that were identified in a search that was initiated by the third-party entity. The third-party entity may provide the input data to server system 230 after the model is trained. Additionally or alternatively, the third-party entity pay provide the input data to server system 230 prior to the model being trained. For example, the input may be part of the data set upon which the model is trained.

Data Set Supplementation

In an embodiment, server system 230 supplements a data set from a third-party entity with local data. For example, server system 230 stores profile data of multiple entities, including users and/or organizations. Each profile record in the profile data may contain more data about an entity (e.g., user) that is indicated in a record of the data set. Some of that additional data may have been provided by the user (e.g., through creation of the user's profile) while other of that additional data may have been generated by server system 230 based on the user's online activities (e.g., number of profile views, number of notifications presented (to the user), number of notifications selected (by the user), number of messages received, number of messages transmitted, number of recommendations selected).

The supplementation may occur upon retrieval of the data set from data storage and prior to generating training data based on the data set. Thus, the training data is also based on the supplemental data. Server system 230 may perform data set supplementation regardless of which data mixing policy is associated with the data set.

By supplementing a data set with profile data that is unavailable (or not easily accessible to) the third-party entity that provided the data set, more accurate predictions and insights may be made with respect to entities indicated in the data set.

Data Mixing: Complete Separation

If the data mixing policy of a data set is complete separation, then training component 260 generates a set of training data based on the data set and no other data set. Training component 260 trains a model for the corresponding third-party entity based on that set of training data and no other training data. Only the third-party entity that provided the data set may leverage that model.

Data Mixing: Coefficient Sharing

If the data mixing policy of a first data set is coefficient sharing, then training component 260 generates a first set of training data based on the first data set and no other data set. Training component 260 trains a first initial model for the corresponding third-party entity based on that set of training data and no other training data. Training component 260 also (1) generates a second set of training data based on a second data set and no other data set and (2) trains a second initial model (for a third-party entity that provided that second data set) based on that second set of training data. Training component 260 combines the coefficients that were machine-learned for the first initial model with the coefficients that were machine-learned for the second initial model to generate merged coefficients. For example, for each feature of multiple models, an average or median (to the extent that there are three or more data sets involved) of multiple coefficients for the feature is computed and associated with that feature. In a related example, a weighted average of the coefficients is computed for each feature. The coefficients from larger data sets may be weighted higher than coefficients from smaller data sets.

Whichever combination or aggregation technique of coefficients is used, the resulting set of merged coefficients (each merged coefficient for a different feature of the models) become a shared coefficient model upon which the corresponding third-party entities (i.e., the provided the data sets upon which the merged coefficients are based) may leverage for generating output (such as a prediction) given certain input. In other words, training component 260 associates the shared coefficient model with each data set upon which the shared coefficient model is based. Thereafter, the third-party entities that provided the data sets may provide input data to server system 230, which invokes (using the input) the shared coefficient model on their behalf.

In an embodiment, depending on the storage separation policy of a data set, where the training of the initial models occurs may differ. For example, if the storage separation policy is no separation, then the training of the initial models may be performed on the same computing device. In contrast, if the storage separate policy is physical separation, then the training of the initial models must be performed on different computing devices.

Data Mixing: Combinable with Public Data

If the data mixing policy of a data set is combinable with public data, then training component 260 generates a set of training data based on the data set and no other data set. This option and the complete separation option ensure that competitors of the third-party entity (that provided the data set) do not benefit from this data set. In a related embodiment, the training data that is generated based on a data set from a client system is combined with training data that is based on public data. Then, the combined training data is used to train a single machine-learned model instead of training two machine-learned models: one based on the data set from the client system and one based on the public data.

Training component 260 trains a model for the corresponding third-party entity based on that set of training data and no other training data. Training component 260 associates the model with the data set. Training component 260 (or another component) uses one or more machine learning techniques to train a base model based on public data or data that is available to server system 230 and is owned by the same entity that owns or operates server system 230. An example of such data is entity profile data and/or online activity data (of registered users) maintained by an online networking service, such as LinkedIn.

The base model and the data set-specific model are combined to create a merged model, such as a GLMix model. Then, at inference time, given input from the third-party entity that provided the data set, both the base model and the data set-specific model are invoked to generate separate output, which is combined to produce a combined output that server system 230 uses to make a decision.

Data Mixing: Mergeable with Data Sets from Similar Entities

If the data mixing policy of a data set is mergeable with data sets from similar third-party entities, then training component 260 identifies a class of third-party entities to which the third-party entity (that provided the data set) belongs or is assigned. The classes of third-party entities may be defined based on size of their respective data sets and/or one or more attributes of the third-party entities. For example, there may be three classes of third-party entities, each depending on the data set that each provides to server system 230. A data set that is larger than a first size threshold is assigned to a first class, a data set that is smaller than the first size threshold but larger than a second size threshold is assigned to a second class, and a data set that is smaller than the second size threshold is assigned to a third class. As another example, each class corresponds to a different industry to which a third-party entity belongs. Examples of industry may include Technology, Finance, Entertainment, Marketing, Transportation, and Manufacturing. As another example, each class corresponds to a different geography in which a third-party entity resides. Examples of geographies include specific countries (e.g., United States, China), specific regions (e.g., Eastern Europe), and specific continents (e.g., South America, Africa).

After class assignment is determined, training component 260 generates a single set of training data based on multiple data sets, each corresponding to a third-party entity that is assigned to the same class. For example, if three third-party entities are assigned to a particular class, then training component 260 retrieves three data sets from data storage, each data set originating from a different one of the three third-party entities. The three data sets may have been stored in the same data storage or may be found in different data storages, such as shared data storage 252 and logically-separated data storage 254. Training component 260 generates a single set of training data based on the three data sets and trains a model using that set of training data.

Generating a set of training data based on multiple data sets may be performed in one of two main ways. In one way, the data sets are first combined and then training data is generated from the combined data set. Alternatively, training data is generated from each data set and then the training data from each set is combined.

Data Mixing: Mergeable with Samples of Data Sets

If the data mixing policy of a data set is mergeable with samples of data sets, then training component 260 samples multiple data sets (e.g., that are associated with the same data mixing policy), resulting in multiple samples, one for each date set. Each sample may be approximately the same size, such as within 5% or 10% of each other. The amount that is sampled may depend on a pre-defined value (e.g., five hundred) that indicates a number of rows or records to sample from a data set. Additionally or alternatively, the amount that is sampled may depend on the size of the smallest data set that shares this same data mixing policy. For example, the amount to sample may be no more than half the number of rows or records in the smallest data set.

Sampling may be performed in one or more ways. For example, a random row or record is selected from a data set during a sampling of the data set. Such a random selection is performed on the data set until a certain number of unique rows or records are selected. As another example, the first N rows or records from the data set are selected. As another example, if the ratio of the size of a data set to the size of the sample is R, then training component 260 selects every $R^{th}$ row or record in the data set.

Given a set of samples, each from a different data set, training component 260 generates a single set of training data based on the set of samples and trains a model based on that set of training data.

Data Mixing: Mergeable with any Data Set

If the data mixing policy of a data set is mergeable with any data set, then training component 260 identifies one or more data sets that are associated with the same data mixing policy, retrieves those data sets from one or more data storages, generates a single set of training data based on the retrieved data sets, and trains a model based on the set of training data. This model may then be leveraged by each third-party entity that provided one of the data sets upon which the set of training data is based. One requirement for a data set that is associated with this data mixing policy is that it cannot be also associated with the end-to-end encryption policy. This requirement may be applicable in cases where decryption is required in order to generate the training data.

Example Process

Figure 3:
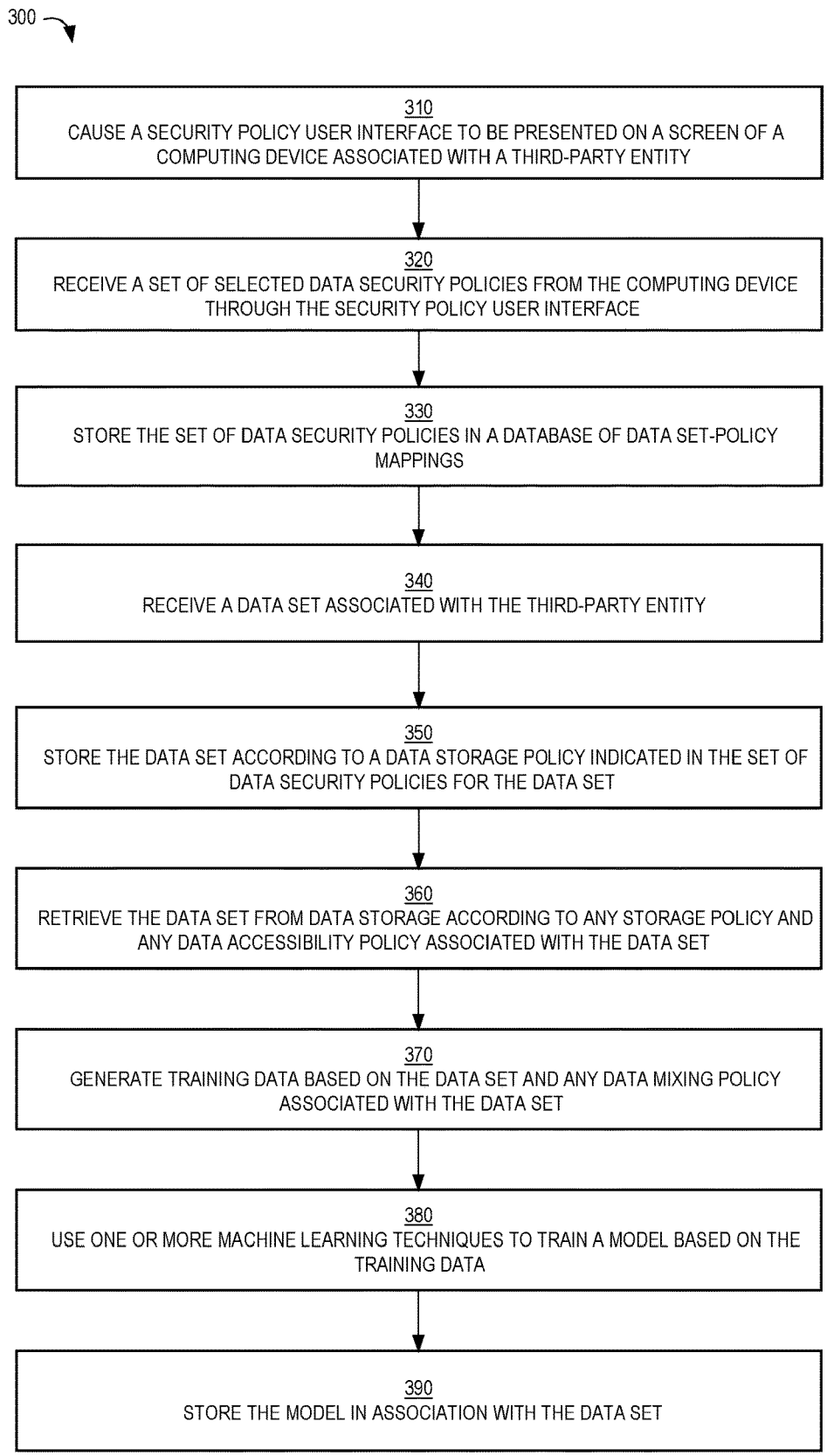
FIG. 3 is a flow diagram that depicts an example process for associating a set of data security policies with a data set, in an embodiment.

FIG. 3 is a flow diagram that depicts an example process 300 for associating a set of data security policies with a data set, in an embodiment. Process 300 may be performed by server system 230.

At block 310, a security policy user interface caused to be presented on a screen of a computing device of a user or representative of a third-party entity. The third-party entity may be considered a data set provider. Block 310 may be performed by data security policy component 240. Code for the user interface may reside in server system 230 and may change from time to time, depending on the availability of the various data security policies, including the addition of new data security policies.

The security policy user interface allows third-party entities to select one or more data security policies, each corresponding to a different policy domain, such as storage separation, data accessibility, and data mixing. For example, one section of the user interface lists three storage separation policies, another section of the user interface lists three data accessibility policies, and another section of the user interface lists six data mixing policies.

At block 320, a set of data security policies is received from the computing device through the security policy user interface. Block 320 may be performed after the user or representative of the third-party entity selected one of the policies listed in each of the three sections and selected a graphical button to submit the selections. In an alternative embodiment, instead of a user interface, blocks 310-320 involve a user or representative of the third-party entity communicating with a representative of the machine learning system and the latter recording the data security policies selections of the third-party entity into a computer system.

At block 330, the set of data security policies is stored in a database of data set-policy mappings (e.g., data set-policy mapping 242). Block 330 may involve generating a data set identifier even though the data set might not have been received yet from the third-party entity. Thus, data is stored that associates the data set with the set of data security policies.

At block 340, a data set of the third-party entity is received. Block 340 may performed in a pull or push manner. For example, a client system of the third-party entity sends the data set to server system 230. Alternatively, data security policy component 240 sends a (e.g., HTTP) request for the data set from the client system and receives the data set in response to the request.

At block 350, the data set is stored according to a data storage policy indicated in the set of data security policies for the data set. Block 350 involves storing the data set in association with a data set identifier for the data set and with the set of data security policies. Block 350 may be performed by storage component 250 and the data set may be stored in one of data storages 252-256. If the data storage policy includes encryption, then storage component 250 may leverage another component to perform secure encryption.

At block 360, the data set is retrieved from data storage. Block 360 may be triggered based on a determination to train a model based on the data set. Specifically, a request for the data set may originate from training component 260. In the embodiment where one of the policy domains is data accessibility, block 360 is preceded by storage component 250 determining the data accessibility policy that is associated with (i.e., was previously selected for) the data set, for example, by checking data set-policy mapping 242. If the data set is associated with a no encryption data accessibility policy, then no decryption is required. If the data set is associated with an encryption-only-on-storage policy, then storage component 250 causes the data set to be decrypted before sending the data set to training component 260. Thus, block 360 may involve decrypting the data set, depending on the data accessibility policy associated with the data set.

At block 370, training data is generated based on the data set. Block 370 may be performed by training component 260 and may involve determining that the data set is associated with a data mixing policy (whether a default policy or a selected policy). Block 370 may involve determining a model definition, determining how to compute a value for each feature indicated in the model definition, and computing the value using the data set.

At block 380, a model is trained based on the training data. After block 370 and prior to block 380, the training data may be stored persistently (i.e., in non-volatile memory). If the training data includes decrypted data and the data accessibility policy of the data set indicates encryption-only-on-storage, then the training data may be encrypted prior to persistent storage. The encryption key that is used to perform the encryption may be different than the original encryption key that was used to encrypt the data set originally.

At block 390, the model is stored in association with the data set and/or third-party entity. For example, an entry in data set-policy mapping 242 that indicates the data set is updated to include a model identifier that uniquely identifies the model. The model identifier may be used, at inference time, to identify the model in persistent storage. Additionally or alternatively, depending on the size and/or complexity of the model, the model may be stored in the same entry of data-set-policy mapping 242.

Model Association Updates in Response to Policy Updates

As described herein, a third-party entity may update (or change) a data mixing policy associated with a data set. Such an update may trigger the removal of one or more associations between the data set and one or more models that were trained based on the data set according to the previous data mixing policy. The removal may involve deleting a model identifier in an entry (of data set-policy mapping 242) that associates the data set with a set of data security policies.

The data mixing policy update may also trigger one or more new models to be trained. For example, a model based on the data set is trained according to the updated data mixing policy while a new model may be trained for other data sets if the data set was one of multiple data sets that were used to train a previous model. For example, if a data set was associated with a mergeable with any data set mixing policy and is updated to be associated with a complete separation data mixing policy, then an old model that was trained based on the data set and one or more other data sets is deleted and a first new model is trained based on the one or more other data sets. Also, a second new model is trained based on the data set (and none other, per the complete separation data mixing policy) and that second new model is associated with the data set instead of the old model.

Leveraging a Model

At inference time, when a model is invoked for a third-party entity, the process executing in server system 230 that invokes the model first determines the model identifier associated with the third-party entity and/or the corresponding data set. For example, given a data set identifier, an entry in data set-policy mapping 242 is identified from among multiple entries. The entry includes a model identifier that the process retrieves and uses to invoke the model, which may have been stored persistently in storage that is separate from data set-policy mapping 242.

If a data set is associated with multiple models, then the process determines a context of the model and uses the context to identify the appropriate model identifier in the entry. For example, if one or more recommendations are to be generated for the third-party entity, then the model that is used to generate scores for candidate entities where those scores are used to generate the one or more recommendations is identified. The context of a model may be encoded in the model identifier to help distinguish the corresponding model from other models associated with the same data set or the same third-party entity.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
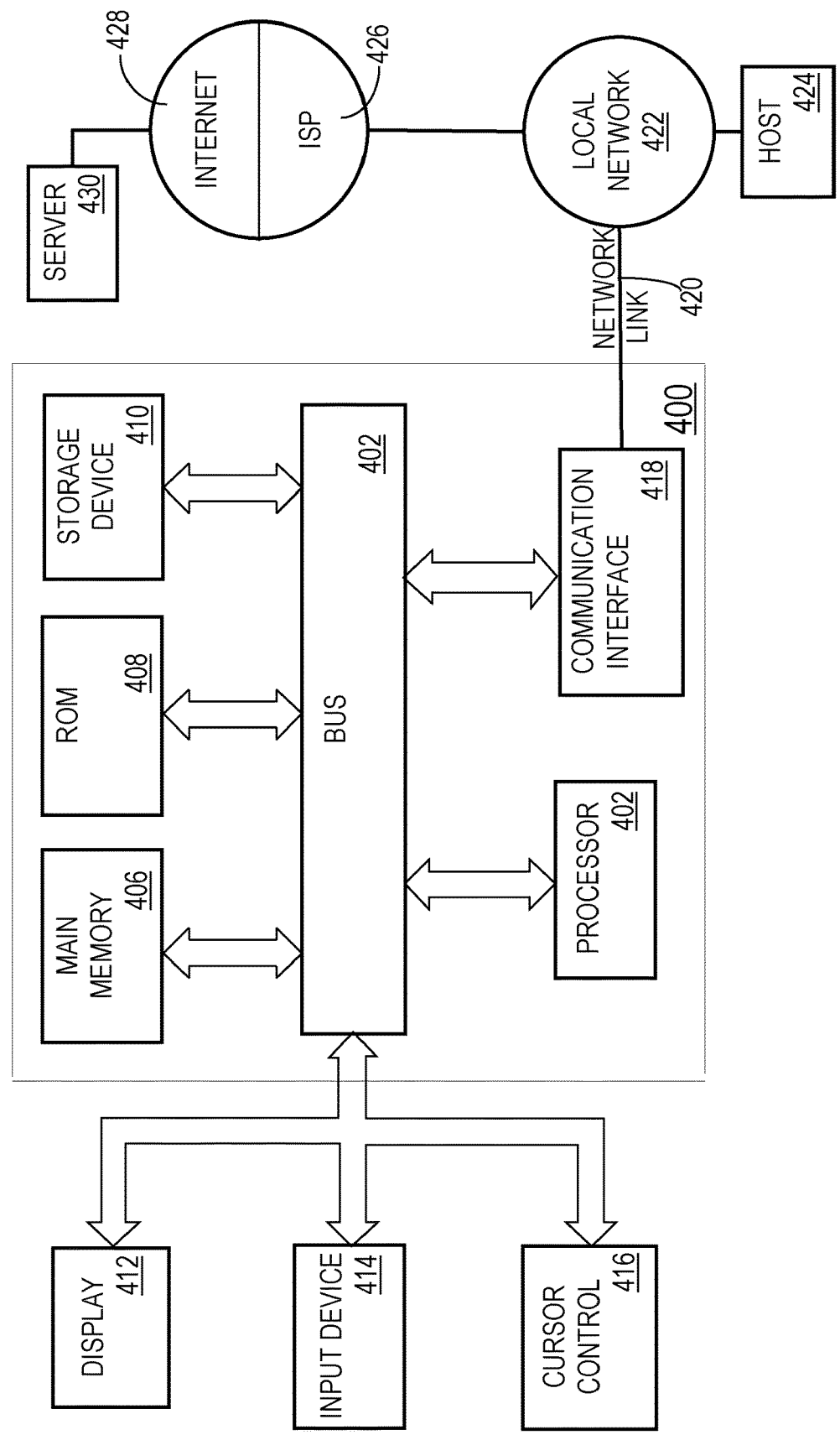
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a third-party entity, a data set;
receiving selection data that indicates that the third-party entity selected a set of data security policies that includes an encryption option and a data mixing option from among a plurality of data mixing options;
in response to receiving the selection data:
storing data that associates the set of data security policies with the data set;
encrypting the data set according to the encryption option to generate an encrypted data set;
storing the encrypted data set in persistent storage;
after storing the encrypted data set:
reading the encrypted data set from the persistent storage into volatile memory;
based on the data mixing option that is associated with the data set, generating training data based on the encrypted data set and training a machine-learned model based on the training data;
storing the machine-learned model in association with the data set and the third-party entity;
wherein the method is performed by one or more computing devices.

2. The method of claim 1, wherein the encryption option is an encryption-on-storage option that is one of a plurality of data accessibility options that includes one or more of: end-to-end encryption or no encryption.

3. The method of claim 1, wherein the set of data security policies includes a data storage option from among a plurality of data storage options; the plurality of data storage options including at least one storage option selected from a group comprising: a no storage separation policy; a logically-separated storage policy; or a physically-separate storage policy; and combinations thereof.

4. The method of claim 1, wherein the plurality of data mixing options include two or more of: complete separation, sharing of coefficients, combinable with public data, mergeable with data sets from similar entities, sample-based mergeable, or mergeable-with-any-data set.

5. The method of claim 1, wherein:
the data set is a first data set and the third-party entity is a first third-party entity;
the data mixing option is a sharing of coefficients option;
the machine-learned model is a third machine-learned model;
the method further comprising:
generating first training data based on the data set and no other data set;
using one or more machine learning techniques to generate a first machine-learned model based on the first training data;
generating second training data based on a second data set from a second third-party entity that is different than the first third-party entity;
using the one or more machine learning techniques to generate a second machine-learned model based on the second training data;
the first machine-learned model comprises a first set of coefficients;
the second machine-learned model comprises a second set of coefficients that is different than the first set of coefficients;
generating the third machine-learned model comprises aggregating the first set of coefficients and the second set of coefficients to generate a third set of coefficients;
the third machine-learned model comprises the third set of coefficients.

6. The method of claim 1, wherein:
the data mixing option is a combinable-with-public data option;
the machine-learned model is a third machine-learned model;
the method further comprising:
generating first training data based on profile data that was uploaded to a content sharing platform by a plurality of users of the content sharing platform;
generating a first machine-learned model based on the first training data; generating second training data based on the data set;
generating a second machine-learned model based on the second training data;
the third machine-learned model is based on the first machine-learned model and the second machine-learned model.

7. The method of claim 1, wherein:
the data mixing option is a mergeable-with-data sets-from-similar-entities option;
the method further comprising:
identifying a plurality of data sets that includes the data set and that are similar in size with each other;
generating training data based on the plurality of data sets;
generating the machine-learned model is based on the training data using one or more machine learning techniques;
storing the machine-learned model in association with the data set and the third-party entity comprises storing the machine-learned model in associated with each data set in the plurality of data sets and with each third-party entity that provided a data set in the plurality of data sets.

8. The method of claim 1, wherein:
the data mixing option is a sample-based mergeable option;
the method further comprising:
identifying a plurality of data sets that includes the data set and one or more other data sets;
for each data set in the plurality of data sets:
retrieving a sample from the data set;
adding the sample to a sample set, wherein a size of each sample in the sample set is approximately the same;
generating training data based on the sample set;

generating the machine-learned model is based on the training data using one or more machine learning techniques;
storing the machine-learned model in association with the data set and the third-party entity comprises storing the machine-learned model in associated with each data set in the plurality of data sets and with each third-party entity that provided a data set in the plurality of data sets.

9. The method of claim 1, wherein:
the data mixing option is a mergeable-with-any-data set option; the method further comprising:
identifying a plurality of data sets that includes the data set and one or more other data sets that are also associated with the mergeable-with-any-data set option;
generating training data based on the plurality of data sets;
generating the machine-learned model is based on the training data using one or more machine learning techniques;
storing the machine-learned model in association with the data set and the third-party entity comprises storing the machine-learned model in associated with each data set in the plurality of data sets and with each third-party entity that provided a data set in the plurality of data sets.

10. The method of claim 1, further comprising:
causing a user interface to be presented on a screen of a computing device;
wherein the user interface indicates (1) a plurality of data accessibility options that includes the encryption option and (2) the plurality of data mixing options;
wherein a user of the computing device selects, through the user interface, the encryption option and the data mixing option.

11. The method of claim 1, further comprising:
receiving second selection data that indicates that a second third-party entity selected a second set of data security policies that includes a data accessibility option from among a plurality of data accessibility options and a second data mixing option from among the plurality of data mixing options;
determining whether the data accessibility option conflicts with the second data mixing option;
in response to determining that the data accessibility option conflicts with the second data mixing option, generating a notification that indicates that a conflict exists and causing the notification to be presented on a computing device.

12. The method of claim 1, wherein the data mixing option is a first data mixing option, the method further comprising:
receiving input that indicates the third-party entity selects a second data mixing option that is different than the first data mixing option;
in response to receiving the input:
updating the set of data security policies to indicate the second data mixing option;
removing an association between the machine-learned model and the data set;
according to the second data mixing option, generating a second machine-learned model based on the data set;
storing the second machine-learned model in association with the data set and the third-party entity.

13. A method comprising:
receiving, from a first third-party entity, a first data set;
receiving first selection data that indicates that the first third-party entity selected a first data mixing option from among a plurality of data mixing options that includes the first data mixing option and a second data mixing option;
in response to receiving the first selection data, storing, in association with the first data set, first data security policy that indicates the first data mixing option;
receiving, from a second third-party entity, a second data set;
receiving second selection data that indicates that the second third-party entity selected the second data mixing option from among the plurality of data mixing options;
in response to receiving the second selection data, storing, in association with the second data set, second data security policy that indicates the second data mixing option;
based on the first data mixing option that is associated with the first data set, generating a first machine-learned model based on the first data set and not based on any other data set;
based on the second data mixing option that is associated with the second data set, generating a second machine-learned model based on the second data set and based on a third data set that is from a third-party entity and not from the first third-party entity or the second third-party entity;
wherein the method is performed by one or more computing devices.

14. One or more storage media storing instructions which, when executed by one or more processors, cause:
receiving, from a third-party entity, a data set;
receiving selection data that indicates that the third-party entity selected a set of data security policies that includes an encryption option and a data mixing option from among a plurality of data mixing options;
in response to receiving the selection data:
storing data that associates the set of data security policies with the data set;
based on the data mixing option, generating training data based on the data set and training a machine-learned model based on the training data;
storing the machine-learned model in association with the data set and the third-party entity.

15. The one or more storage media of claim 14, wherein the encryption option is an encryption-on-storage option that is one of a plurality of data accessibility options that includes one or more of: end-to-end encryption or no encryption.

16. The one or more storage media of claim 14, wherein the set of data security policies includes a data storage option from among a plurality of data storage options; the plurality of data storage options including at least one data storage option selected from a group comprising: a no storage separation policy; a logically-separated storage policy; or a physically-separate storage policy; and combinations thereof.

17. The one or more storage media of claim 14, wherein the plurality of data mixing options include two or more of: complete separation, sharing of coefficients, combinable with public data, mergeable with data sets from similar entities, sample-based mergeable, or mergeable-with-any-data set.

18. The one or more storage media of claim 14, wherein the instructions, when executed by the one or more processors, further cause:

causing a user interface to be presented on a screen of a computing device;

wherein the user interface indicates (1) a plurality of data accessibility options that includes the encryption option and (2) the plurality of data mixing options;

wherein a user of the computing device selects, through the user interface, the encryption option and the data mixing option.

19. The one or more storage media of claim 14, wherein the instructions, when executed by the one or more processors, further cause:

receiving second selection data that indicates that a second third-party entity selected a second set of data security policies that includes a data accessibility option from among a plurality of data accessibility options and a second data mixing option from among the plurality of data mixing options;

determining whether the data accessibility option conflicts with the second data mixing option;

in response to determining that the data accessibility option conflicts with the second data mixing option, generating a notification that indicates that a conflict exists and causing the notification to be presented on a computing device.

20. The one or more storage media of claim 14, wherein the data mixing option is a first data mixing option, wherein the instructions, when executed by the one or more processors, further cause:

receiving input that indicates the third-party entity selects a second data mixing option that is different than the first data mixing option;

in response to receiving the input:

updating the set of data security policies to indicate the second data mixing option;

removing an association between the machine-learned model and the data set;

according to the second data mixing option, generating a second machine-learned model based on the data set;

storing the second machine-learned model in association with the data set and the third-party entity.

\* \* \* \* \*